(12) United States Patent
Singh et al.

(10) Patent No.: US 9,819,377 B1
(45) Date of Patent: Nov. 14, 2017

(54) CELL PHONE HOLDER

(71) Applicants: Vinay Singh, Portland, OR (US);
Nataliia Singh, Portland, OR (US)

(72) Inventors: Vinay Singh, Portland, OR (US);
Nataliia Singh, Portland, OR (US)

( * ) Notice: Subject to any disclaimer, the term of this patent is extended or adjusted under 35 U.S.C. 154(b) by 0 days.

(21) Appl. No.: 15/397,268

(22) Filed: Jan. 3, 2017

(51) Int. Cl.
*H04M 1/00* (2006.01)
*H04B 1/38* (2015.01)
*H04B 1/3877* (2015.01)

(52) U.S. Cl.
CPC .................................. *H04B 1/3877* (2013.01)

(58) Field of Classification Search
CPC ........ H04M 1/04; H04M 1/12; H04M 1/6041; H04M 1/6075; H04B 1/385; H04B 1/3877; H04B 1/3888
USPC ............ 455/90.3, 569.1, 575.1, 575.8, 575.9
See application file for complete search history.

(56) References Cited

U.S. PATENT DOCUMENTS

| | | | | |
|---|---|---|---|---|
| 5,187,744 A * | 2/1993 | Richter | ............... | B60R 11/0241 379/449 |
| 5,555,302 A * | 9/1996 | Wang | .................. | B60R 11/0241 379/426 |
| 5,668,869 A | 9/1997 | Zinno | | |
| 5,825,874 A * | 10/1998 | Humphreys | ........ | B60R 11/0241 379/446 |
| 5,833,100 A | 11/1998 | Kim | | |
| 5,836,563 A * | 11/1998 | Hsin-Yung | .......... | B60R 11/0241 379/426 |
| 7,540,459 B2 * | 6/2009 | Asano | ................. | B60R 11/0241 379/446 |
| 7,614,595 B2 * | 11/2009 | Richter | ............... | B60R 11/0241 379/446 |
| 7,920,905 B2 * | 4/2011 | Bury | .................... | B60R 11/0241 455/575.8 |
| 8,068,888 B2 | 11/2011 | Ross, III | | |
| 8,638,557 B2 * | 1/2014 | Tsai | ..................... | F16M 11/041 248/919 |
| 8,818,465 B1 | 8/2014 | Gorham, Jr. | | |
| 9,080,714 B2 * | 7/2015 | Minn | .................. | B60R 11/0241 |
| D737,806 S | 9/2015 | Gail | | |
| 2011/0132925 A1 | 6/2011 | Culver | | |
| 2014/0243051 A1 | 8/2014 | Griffin | | |

FOREIGN PATENT DOCUMENTS

EP 1182210 A2 6/2005

* cited by examiner

*Primary Examiner* — Quochien B Vuong
(74) *Attorney, Agent, or Firm* — Kyle A. Fletcher, Esq.

(57) ABSTRACT

The cell phone holder is an adjustable casing. The cell phone holder contains a cellular phone. The cell phone holder is removably attached to an automobile. The dimensions of the cell phone holder are adjustable such that the cell phone holder will accommodate cellular phones of various sizes. The cell phone holder comprises a first spring, a second spring, a first side panel, a second side panel, a rear panel, and a bottom panel. The first side panel attaches to the first spring. The second side panel attaches to the second spring. The bottom panel, the first spring, and the second spring attach to the rear panel.

18 Claims, 6 Drawing Sheets

CELL PHONE HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of telephonic communication, more specifically, a casing or exchangeable faceplate for communication equipment.

SUMMARY OF INVENTION

The cell phone holder is an adjustable casing. The cell phone holder contains a cellular phone. The cell phone holder is removably attached to an automobile. The dimensions of the cell phone holder are adjustable such that the cell phone holder will accommodate cellular phones of various sizes.

These together with additional objects, features and advantages of the cell phone holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the cell phone holder in detail, it is to be understood that the cell phone holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cell phone holder.

It is therefore important that the claims be regarded as including such equivalent construction insofar as they do not depart from the spirit and scope of the cell phone holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
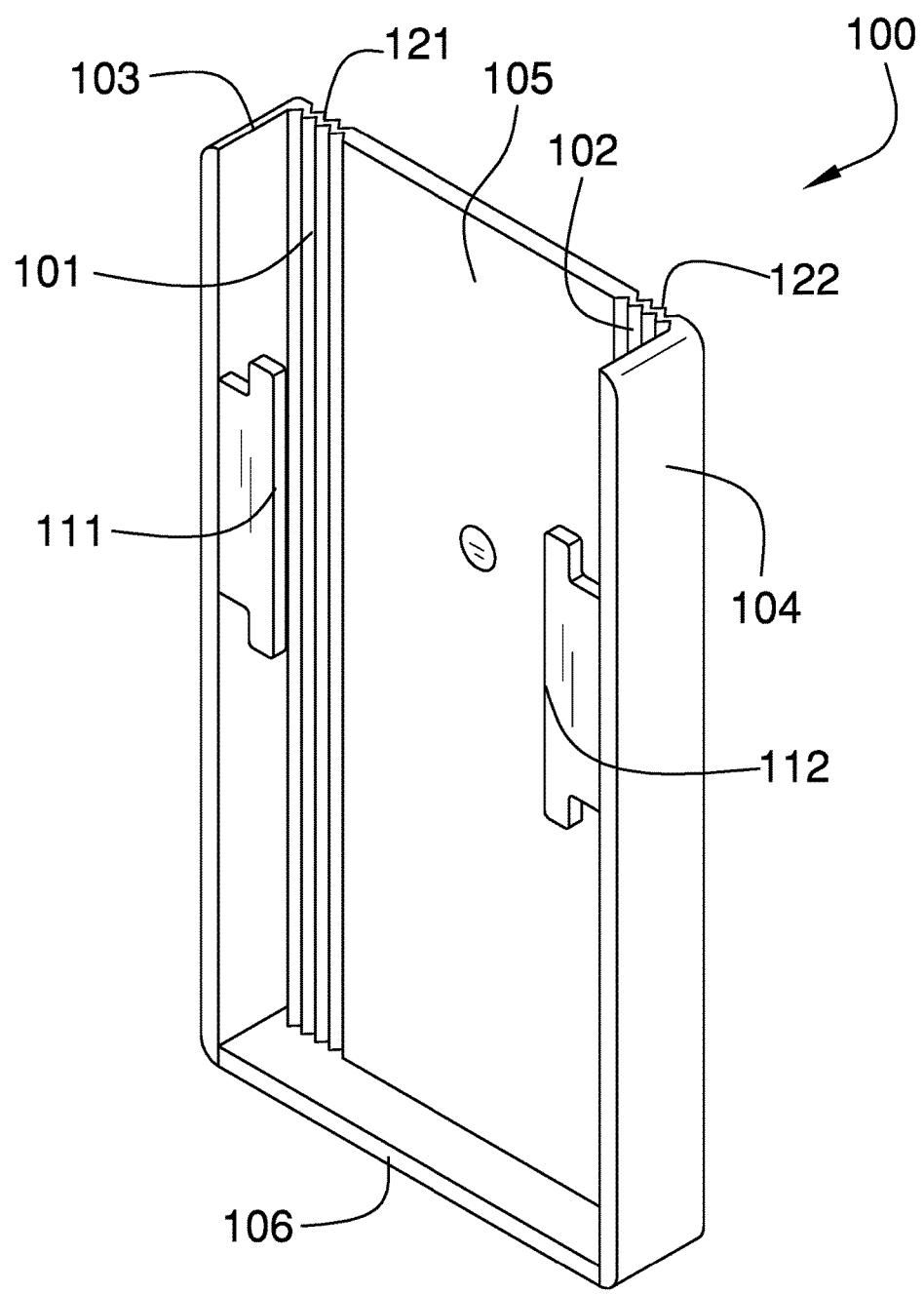
FIG. 1 is a front perspective view of an embodiment of the disclosure.
Figure 2:
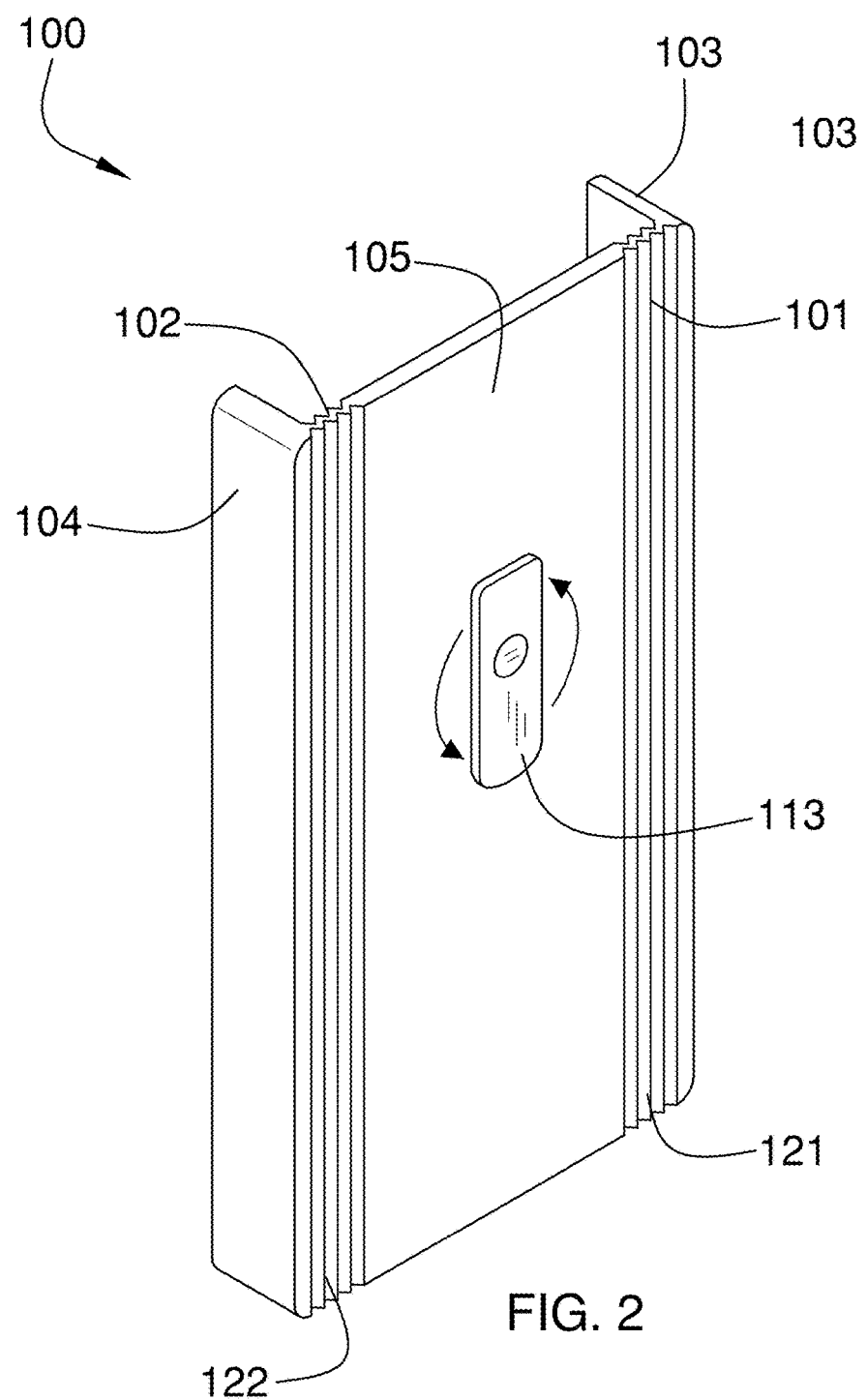
FIG. 2 is a rear perspective view of an embodiment of the disclosure.
Figure 3:
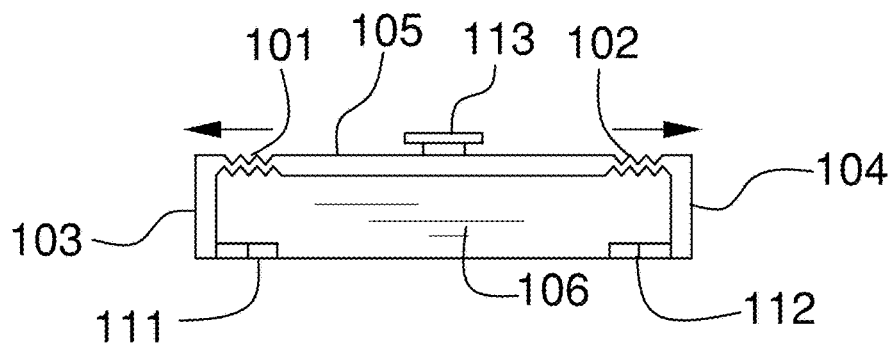
FIG. 3 is a top view of an embodiment of the disclosure.
Figure 4:
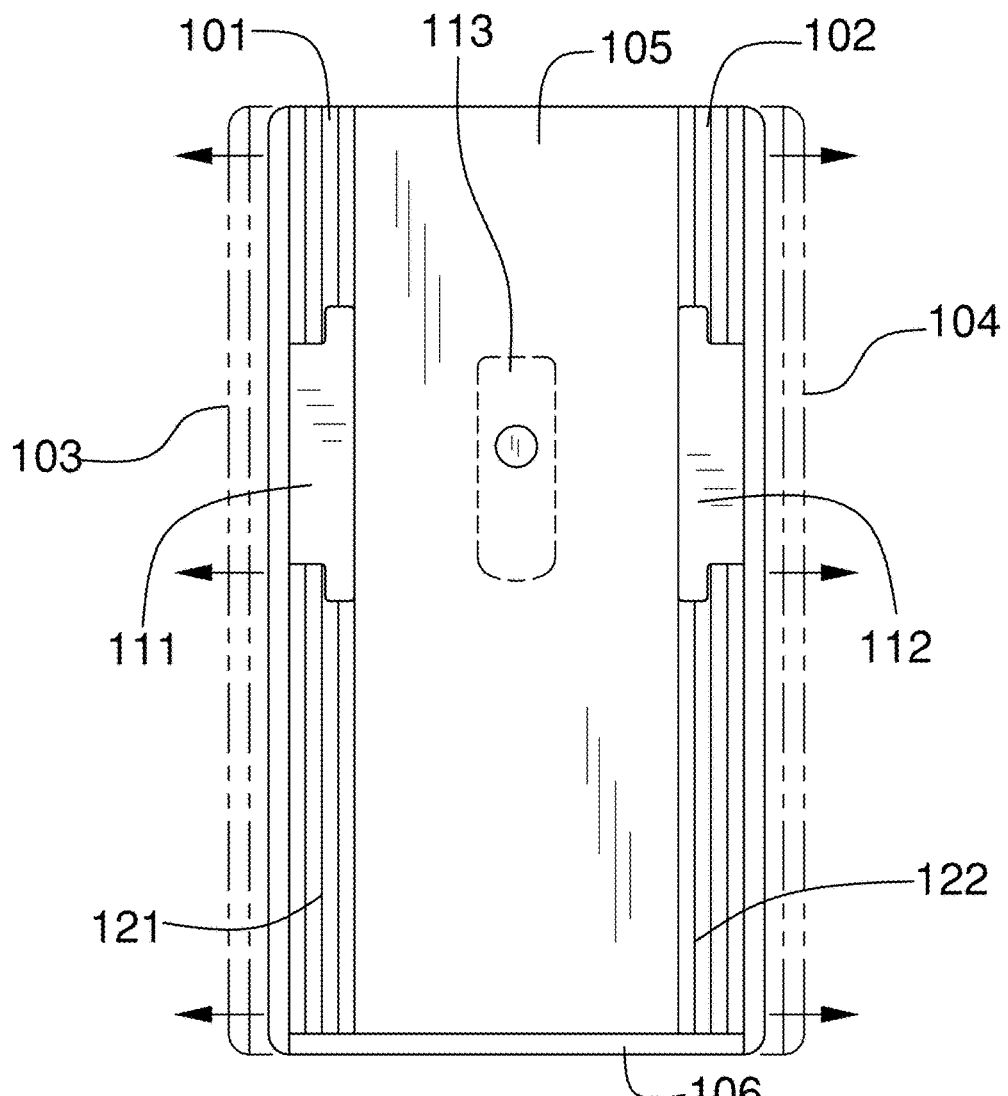
FIG. 4 is a front view of an embodiment of the disclosure.
Figure 5:
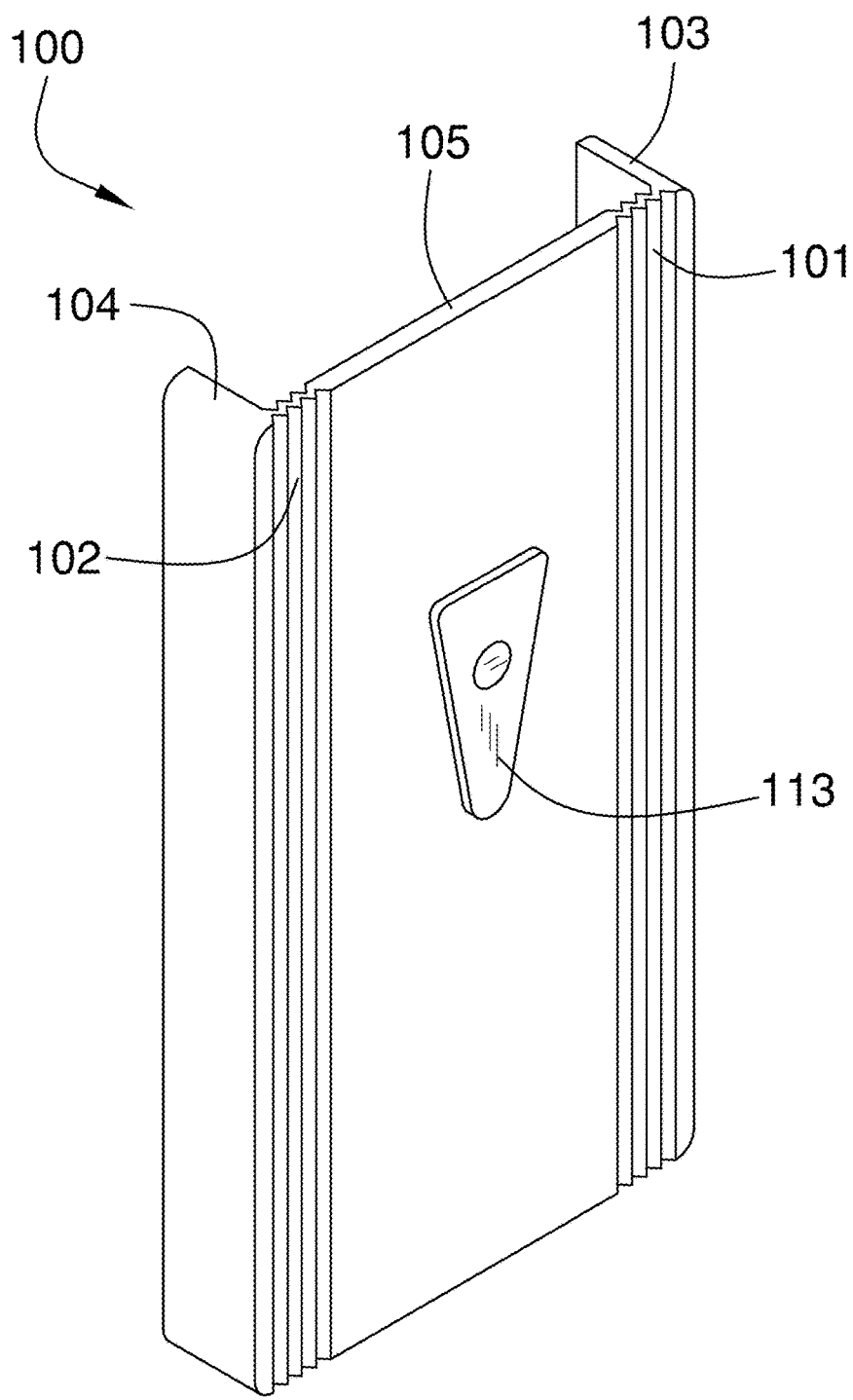
FIG. 5 is a rear perspective view of an alternative embodiment of the disclosure.
Figure 6:
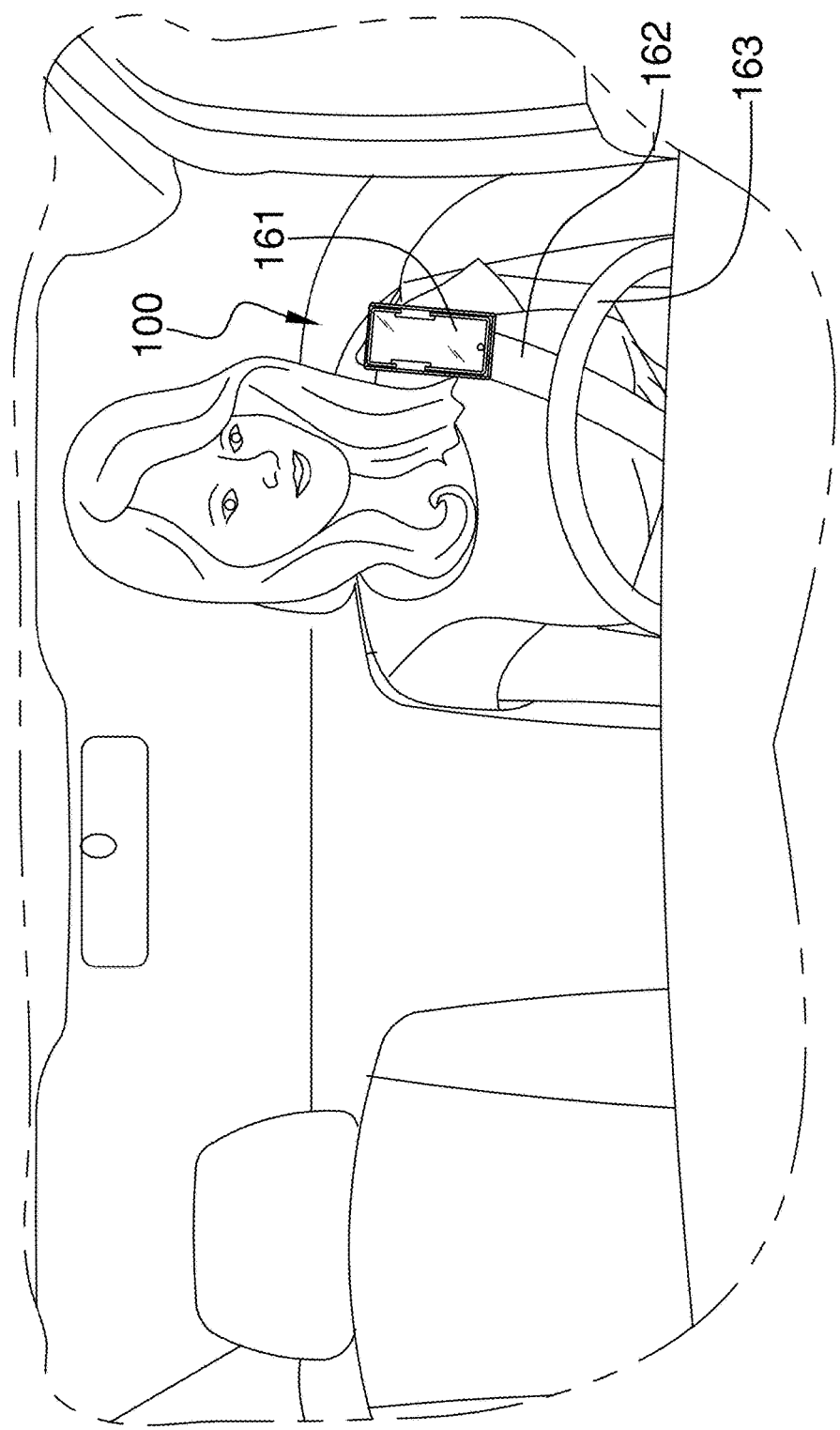
FIG. 6 is an in use view of an embodiment of the disclosure.
Figure 7:
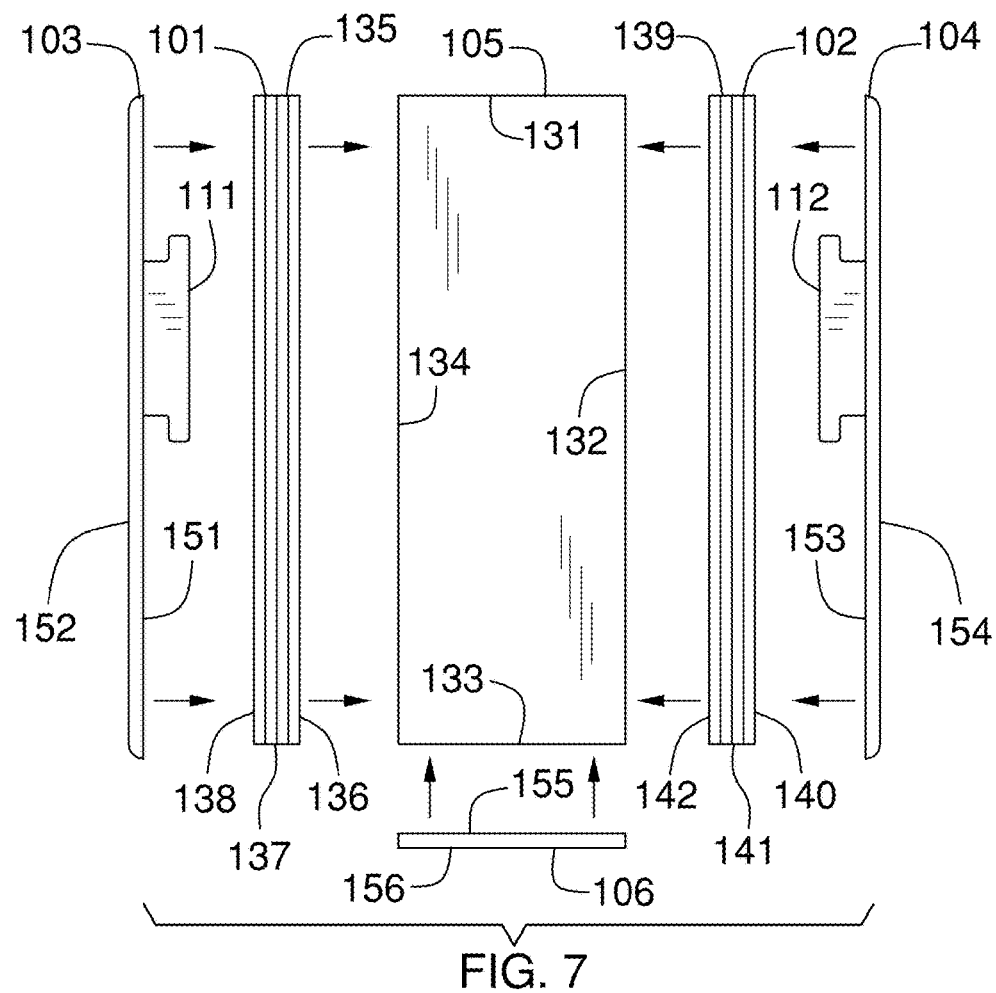
FIG. 7 is an exploded view of an embodiment of the disclosure.
Figure 8:
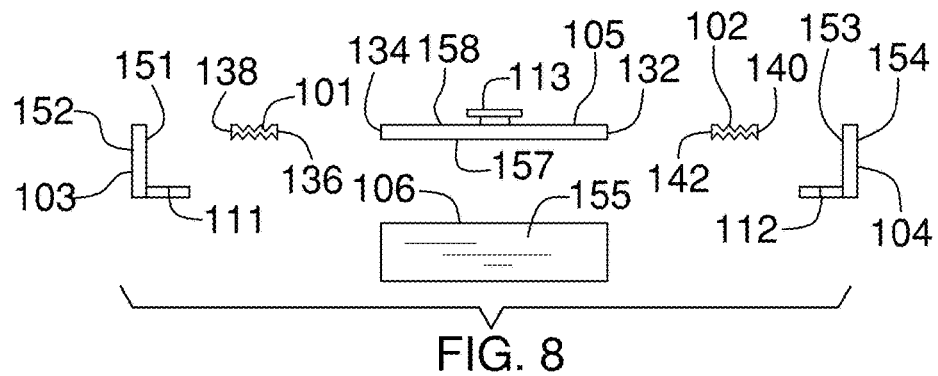
FIG. 8 is an exploded view of an embodiment of the disclosure.

Detailed reference will now be made to one or more potential embodiments of the disclosure, which are illustrated in FIGS. 1 through 8.

The cell phone holder 100 (hereinafter invention) comprises a first spring 101, a second spring 102, a first side panel 103, a second side panel 104, a rear panel 105, and a bottom panel 106. The first side panel 103 attaches to the first spring 101. The second side panel 104 attaches to the second spring 102. The bottom panel 106, the first spring 101, and the second spring 102 attach to the rear panel 105. The first spring 101 and the second spring 102 are adjustable structures that allow for the adjustment of one or more dimensions of the invention 100. The invention 100 is an adjustable casing. The invention 100 contains a cellular phone 161. The invention 100 is configured to be removably attached to an automobile 163. The dimensions of the cell phone holder are adjustable such that the invention 100 will accommodate cellular phones 161 of various sizes.

The first spring 101 is a rectangular first elastic semi-rigid structure. The first spring 101 is a tension spring. The first spring 101 is formed with a first plurality of accordion folds 121. The first spring 101 is further defined with a fifth edge 135, a sixth edge 136, a seventh edge 137, and an eighth edge 138. The first plurality of accordion folds 121 is formed such that the span between the sixth edge 136 and the eighth edge 138 expands when a tensile force is applied to the first spring 101 in a direction that is perpendicular to the sixth edge 136. When the tensile force is removed, the first spring 101 will attempt to return to its relaxed shape. The purpose of extending the span between the sixth edge 136 and the eighth edge 138 is to increase the span between the first side panel 103 and the second side panel 104 such that cellular phones 161 of variable size may be placed between the first side panel 103 and the second side panel 104. As the first spring 101 returns to its relaxed shape, the first spring 101 will meet resistance from the cellular phone 161 preventing further relaxation of the first spring 101. The contracting force remaining within the first spring 101 will press against the cellular phone 161 thereby holding the cellular phone 161 in position.

The second spring 102 is a rectangular first elastic semi-rigid structure. The second spring 102 a tension spring. The second spring 102 is formed with a second plurality of accordion folds 122. The second spring 102 is further defined with a ninth edge 139, a tenth edge 140, an eleventh edge 141, and a twelfth edge 142. The second plurality of accordion folds 122 are formed such that the span between the tenth edge 140 and the twelfth edge 142 expands when a tensile force is applied to the second spring 102 in a direction that is perpendicular to the tenth edge 140. When the tensile force is removed, the second spring 102 will attempt to return to its relaxed shape. The purpose of extending the span between the tenth edge 140 and the twelfth edge 142 is to increase the span between the first side panel 103 and the second side panel 104 such that cellular phones 161 of variable size may be placed between the first side panel 103 and the second side panel 104. As the second spring 102 returns to its relaxed shape, the second spring 102 will meet resistance from the cellular phone 161 preventing further relaxation of the second spring 102. The contracting force remaining within the second spring 102 will press against the cellular phone 161 thereby holding the cellular phone 161 in position.

In the first potential embodiment of the disclosure, the first spring 101 and the second spring 102 are identical.

The rear panel 105 is a first rectangular plate. The rear panel 105 is further defined with a first edge 131, a second edge 132, a third edge 133, a fourth edge 134, a seventh surface 157, and an eighth surface 158. The rear panel 105 further comprises a third clip 113. The third clip 113 is mounted in the center of the eighth surface 158. As shown most clearly in FIG. 6, the third clip 113 is a commercially available clip that is used to attach the invention 100 to a seat belt 162 contained within the automobile 163. As shown most clearly in FIG. 5, the third clip 113 is a spring-loaded clip. In the second potential embodiment of the disclosure, as shown most clearly in FIG. 2, the third clip 113 is mounted on a pivot such that the third clip 113 will rotate.

The first side panel 103 comprises a second rectangular plate. The first side panel 103 is further defined with a first surface 151 and a second surface 152. The first side panel 103 further comprises a first clip 111. The first clip 111 is a first T shaped projection that projects perpendicularly away from the first surface 151 of the first side panel 103. The first clip 111 is positioned on the first surface 151 of the first side panel 103 such that the cellular phone 161 will fit between the rear panel 105 and the first clip 111. The first side panel 103 forms an outer edge of the invention 100.

The second side panel 104 comprises a third rectangular plate. The second side panel 104 is further defined with a third surface 153 and a fourth surface 154. The second side panel 104 further comprises a second clip 112. The second clip is a second T shaped projection that projects perpendicularly away from the third surface 153 of the second side panel 104. The second clip 112 is positioned on the third surface 153 of the second side panel 104 such that the cellular phone 161 will fit between the rear panel 105 and the second clip 112. The second side panel 104 forms an outer edge of the invention 100.

The bottom panel 106 is further defined with a fifth surface 155 and a sixth surface 156. The fifth surface 155 forms a supporting surface upon which the cellular phone 161 rests.

The invention 100 is assembled as described in this paragraph. The twelfth edge 142 of the second spring 102 attaches to the second edge 132 of the rear panel 105. The third surface 153 of the second side panel 104 attaches to the tenth edge 140 of the second spring 102 such that the second clip 112 projects towards the first side panel 103. The sixth edge 136 of the first spring 101 attaches to the fourth edge 134 of the rear panel 105 such that the first clip 111 projects towards the second side panel 104. The first surface 151 of the first side panel 103 attaches to the eighth edge 138 of the first spring 101. The fifth surface 155 of the bottom panel 106 attaches to the third edge 133 of the rear panel 105. The bottom panel 106 may be in contact with but does not attach to the first side panel 103 or the second side panel 104.

To use the invention 100 a cellular phone 161 is placed within the invention 100 between the seventh surface 157 of the rear plate 105 and the first clip 111 and the second clip 112. The invention 100 is then attached to a seat belt 162, or other location within the automobile 163, using the third clip 113.

The following definitions were used in this disclosure:

Accordion Fold: As used in this disclosure, an accordion fold is a pleated structure that resembles the bellows of an accordion.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Clip: As used in this disclosure, a clip is a fastener that attaches to an object by gripping or clasping the object.

Elastic: As used in this disclosure, an elastic is a material or object that deforms when a force is applied to it and that is able to return to its original shape after the force is removed. A material that exhibits these qualities is also referred to as an elastomeric material.

Pivot: As used in this disclosure, a pivot is a rod or shaft around which an object rotates or swings.

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

Relaxed Shape: As used in this disclosure, a structure is considered to be in its relaxed state when no shear, strain, or torsional forces are being applied to the structure.

Semi-Rigid Structure: As used in this disclosure, a semi-rigid structure is a solid structure that is stiff but not wholly inflexible and that will deform under force before breaking.

A semi-rigid structure may or may not behave in an elastic fashion in that a semi-rigid structure need not return to a relaxed shape.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Tension Spring: As used in this disclosure, a tension spring is a spring that opposes tensile forces that are applied in a direction that extends one or more dimensions of the tension spring.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A casing comprising:
a first spring, a second spring, a first side panel, a second side panel, a rear panel, and a bottom panel;
wherein the first side panel attaches to the first spring;
wherein the second side panel attaches to the second spring;
wherein the bottom panel, the first spring, and the second spring attach to the rear panel;
wherein the first spring and the second spring are adjustable structures that allow for the adjustment of one or more dimensions of the casing;
wherein the casing is an adjustable casing;
wherein the casing receives and stores a cellular phone;
wherein the casing is removably attached to an automobile;
wherein the dimensions of the casing are adjustable such that the casing will accommodate a cellular phone selected from a plurality of cellular phones that are differentiated by size;
wherein the first spring is a rectangular first elastic semi-rigid structure;
wherein the first spring is a tension spring;
wherein the first spring is further defined with a fifth edge, a sixth edge, a seventh edge, and an eighth edge;
wherein the second spring is a rectangular first elastic semi-rigid structure;
wherein the second spring a tension spring;
wherein the second spring is further defined with a ninth edge, a tenth edge, an eleventh edge, and a twelfth edge.

2. The casing according to claim 1
wherein the first spring is formed with a first plurality of accordion folds;
wherein the second spring is formed with a second plurality of accordion folds.

3. The casing according to claim 2
wherein the first plurality of accordion folds is formed such that the span between the sixth edge and the eighth edge expands when a tensile force is applied to the first spring in a direction that is perpendicular to the sixth edge;
wherein when the tensile force is removed, the first spring returns to its relaxed shape;
wherein the second plurality of accordion folds are formed such that the span between the tenth edge and the twelfth edge expands when a tensile force is applied to the second spring in a direction that is perpendicular to the tenth edge;
wherein when the tensile force is removed, the second spring returns to its relaxed shape.

4. The casing according to claim 3
wherein the contracting force remaining within the first spring will press against the cellular phone as the first spring returns to its relaxed shape;
wherein as the second spring returns to its relaxed shape, the second spring will meet resistance from the cellular phone preventing further relaxation of the second spring.

5. The casing according to claim 4 wherein the first spring and the second spring are identical.

6. The casing according to claim 5
wherein the rear panel is a first rectangular plate;
wherein the rear panel is further defined with a first edge, a second edge, a third edge, a fourth edge, a seventh surface, and an eighth surface.

7. The casing according to claim 6
wherein the rear panel further comprises a third clip;
wherein the third clip is mounted in the center of the eighth surface.

8. The casing according to claim 7
wherein the first side panel comprises a second rectangular plate;
wherein the first side panel is further defined with a first surface and a second surface;
wherein the second side panel comprises a third rectangular plate;
wherein the second side panel is further defined with a third surface and a fourth surface.

9. The casing according to claim 8
wherein the first side panel further comprises a first clip;
wherein the first clip is a first T shaped projection that projects perpendicularly away from the first surface of the first side panel;
wherein the first clip is positioned on the first surface of the first side panel such that the cellular phone will fit between the rear panel and the first clip;
wherein the second side panel further comprises a second clip;
wherein the second clip is a second T shaped projection that projects perpendicularly away from the third surface of the second side panel;
wherein the second clip is positioned on the third surface of the second side panel such that the cellular phone will fit between the rear panel and the second clip.

10. The casing according to claim 9
wherein the bottom panel is further defined with a fifth surface and a sixth surface;
wherein the fifth surface forms a supporting surface upon which the cellular phone rests.

11. The casing according to claim 10
wherein the twelfth edge of the second spring attaches to the second edge of the rear panel;

wherein the third surface of the second side panel attaches to the tenth edge of the second spring such that the second clip projects towards the first side panel;

wherein the sixth edge of the first spring attaches to the fourth edge of the rear panel such that the first clip projects towards the second side panel;

wherein the first surface of the first side panel attaches to the eighth edge of the first spring;

wherein the fifth surface of the bottom panel attaches to the third edge of the rear panel;

wherein to use the casing a cellular phone is placed within the casing between the seventh surface of the rear plate and the first clip and the second clip;

wherein the casing is then attached to a seat belt, or other location within the automobile, using the third clip.

12. The casing according to claim 11 wherein the third clip is a spring loaded clip.

13. The casing according to claim 12 wherein the third clip is mounted on a pivot.

14. A casing comprising
a first spring, a first side panel, a second side panel, a rear panel, and a bottom panel;

wherein the bottom panel, the first spring, and the second side panel attach to the rear panel;

wherein the first spring is an adjustable structure that allows for the adjustment of one or more dimensions of the casing;

wherein the casing is an adjustable casing;

wherein the casing receives and stores a cellular phone;

wherein the casing is removably attached to an automobile;

wherein the dimensions of the casing are adjustable such that the casing will accommodate a cellular phone selected from a plurality of cellular phones that are differentiated by size;

wherein the first spring is a rectangular first elastic semi-rigid structure;

wherein the first spring is a tension spring;

wherein the first spring is further defined with a fifth edge, a sixth edge, a seventh edge, and an eighth edge;

wherein the first spring is formed with a first plurality of accordion folds;

wherein the first plurality of accordion folds is formed such that the span between the sixth edge and the eighth edge expands when a tensile force is applied to the first spring in a direction that is perpendicular to the sixth edge;

wherein when the tensile force is removed, the first spring returns to its relaxed shape.

15. The casing according to claim 14
wherein the rear panel is a first rectangular plate;

wherein the rear panel is further defined with a first edge, a second edge, a third edge, a fourth edge, a seventh surface, and an eighth surface;

wherein the rear panel further comprises a third clip;

wherein the third clip is mounted in the center of the eighth surface;

wherein the first side panel comprises a second rectangular plate;

wherein the first side panel is further defined with a first surface and a second surface;

wherein the second side panel comprises a third rectangular plate;

wherein the second side panel is further defined with a third surface and a fourth surface;

wherein the first side panel further comprises a first clip;

wherein the first clip is a first T shaped projection that projects perpendicularly away from the first surface of the first side panel;

wherein the first clip is positioned on the first surface of the first side panel such that the cellular phone will fit between the rear panel and the first clip;

wherein the second side panel further comprises a second clip;

wherein the second clip is a second T shaped projection that projects perpendicularly away from the third surface of the second side panel;

wherein the second clip is positioned on the third surface of the second side panel such that the cellular phone will fit between the rear panel and the second clip;

wherein the bottom panel is further defined with a fifth surface and a sixth surface;

wherein the fifth surface forms a supporting surface upon which the cellular phone rests.

16. The casing according to claim 15
wherein the third surface of the second side panel attaches to the second edge of the rear panel such that the second clip projects towards the first side panel;

wherein the sixth edge of the first spring attaches to the fourth edge of the rear panel such that the first clip projects towards the second side panel;

wherein the first surface of the first side panel attaches to the eighth edge of the first spring;

wherein the fifth surface of the bottom panel attaches to the third edge of the rear panel;

wherein to use the casing a cellular phone is placed within the casing between the seventh surface of the rear plate and the first clip and the second clip;

wherein the casing is then attached to a seat belt, or other location within the automobile, using the third clip.

17. The casing according to claim 16 wherein the third clip is a spring loaded clip.

18. The casing according to claim 17 wherein the third clip is mounted on a pivot.

* * * * *